United States Patent [19]
Dillon

[11] 3,729,773
[45] May 1, 1973

[54] METHOD FOR WASHING AND CHILLING EVISCERATED FOWL

[75] Inventor: Janus J. Dillon, Irving, Tex.

[73] Assignee: FEEI, Inc., Dallas, Tex.

[22] Filed: Nov. 26, 1971

[21] Appl. No.: 202,202

[52] U.S. Cl. .................................................17/11
[51] Int. Cl. ............................................A22c 21/00
[58] Field of Search ...................62/63, 378; 17/11

[56] References Cited

UNITED STATES PATENTS

2,981,081  4/1961  Larsen ................................62/63 X
3,410,101  11/1968  Morris .................................62/63

Primary Examiner—Robert Peshock
Attorney—Richards, Harris & Hubbard

[57] ABSTRACT

A process for washing and cooling fowl for human consumption includes conveying the fowl through a plurality of processing zones. After evisceration, the fowl are conveyed to a first zone where they are internally washed and externally washed. The fowl are then conveyed through a second zone where they are prechilled. Thereafter, the fowl are transferred from a first conveyor system to a second conveyor system, the latter including shackles which can suspend a plurality of fowl from a single truck on a conveyor. The fowl are then conveyed on the multiple fowl shackle through a third zone in which they are cooled by contact with a chilled liquid spray and by contact with a cold gas stream. In the third zone the fowl are conveyed through a multi-path arrangement in a plurality of subzones. Except for the entry and exit points from one subzone to another, the subzones are divided by walls. The chilled liquid and the cold gas are directed in a predetermined pattern through the plurality of subzones. When the fowl are removed from the third zone, they are transferred to another processing line for packaging or the like.

34 Claims, 7 Drawing Figures

Patented May 1, 1973

Patented May 1, 1973

METHOD FOR WASHING AND CHILLING EVISCERATED FOWL

BACKGROUND OF THE INVENTION

The present invention relates to the processing of fowl and more particularly to the washing and chilling of eviscerated fowl prior to packaging.

A common processing technique for chilling eviscerated fowl prior to packaging is to dip the fowl in a common tank containing chilled water. Normally, the fowl are attached to shackles on a conveying system which immerses the fowl in an elongate tank filled with a chilled liquid or are dropped into the tank and conveyed to an exit point by any of various internal conveying methods such as a drag conveyor, belt, ribbon conveyor, or the like. The same chilled liquid is used to chill a large number of fowl. This technique has a number of drawbacks. Among them is bacterial cross-contamination which can be initiated when a contaminated fowl is passed through the chill tank. Fowl subsequently immersed in the chill tank can be affected by bacteria removed from the contaminated fowl as it is passed through the chill tank. Consequently, the chilled liquid in the common chill tank must be changed frequently in an attempt to eliminate the possibility of such cross-contamination. The constant replacement of the chilled liquid requires great amounts of the liquid, resulting in large expenditures on cooling equipment and power. In addition, the common chill tanks are somewhat inefficient since the ratio of the volume of chilled liquid to contact area of fowl is quite high.

Washing is customarily done by fixed spray fixtures such as conventional shower heads or spray tips. This type of fixture is inefficient as they apply the cleaning fluid to one point only. Therefore, many different spray fixtures are necessary to provide complete coverage.

The use of liquid sprays and of a cold gas such as air for chilling fowl has heretofore been impractical because of the large volume of processing equipment necessary when utilizing these techniques. The present invention provides an economical technique by which cold gas and cold liquid contact is utilized to chill fowl, while overcoming the drawbacks of the fixed spray wash and common chill tank. The present invention reduces the possibility of cross-contamination among fowl being washed and chilled. In addition, the present invention provides conservation of the liquids and gases utilized in the chill and wash operations.

SUMMARY OF THE INVENTION

In a method of processing eviscerated fowl, prior to packaging wherein the fowl are suspended from shackles on a conveying system, the present invention provides an improved method comprising conveying the fowl through a first washing zone, spraying the fowl with a washing fluid in the first zone to clean and flush the internal portions of the fowl, spraying the fowl with a wash fluid in the first zone to clean and flush the external portions of the fowl, and conveying the fowl to another processing zone wherein the fowl is sprayed with a chilled fluid. In a preferred embodiment of the present invention, the fowl are suspended in multiples from a single suspension point on the conveying system and are simultaneously contacted with a spray of chilled liquid and a stream of colled gas.

BRIEF DESCRIPTION OF THE DRAWINGS

A better understanding of the present invention will be acquired by reading the ensuing specification in conjunction with the accompanying drawings wherein.

DESCRIPTION OF PREFERRED EMBODIMENT

Figure 1:
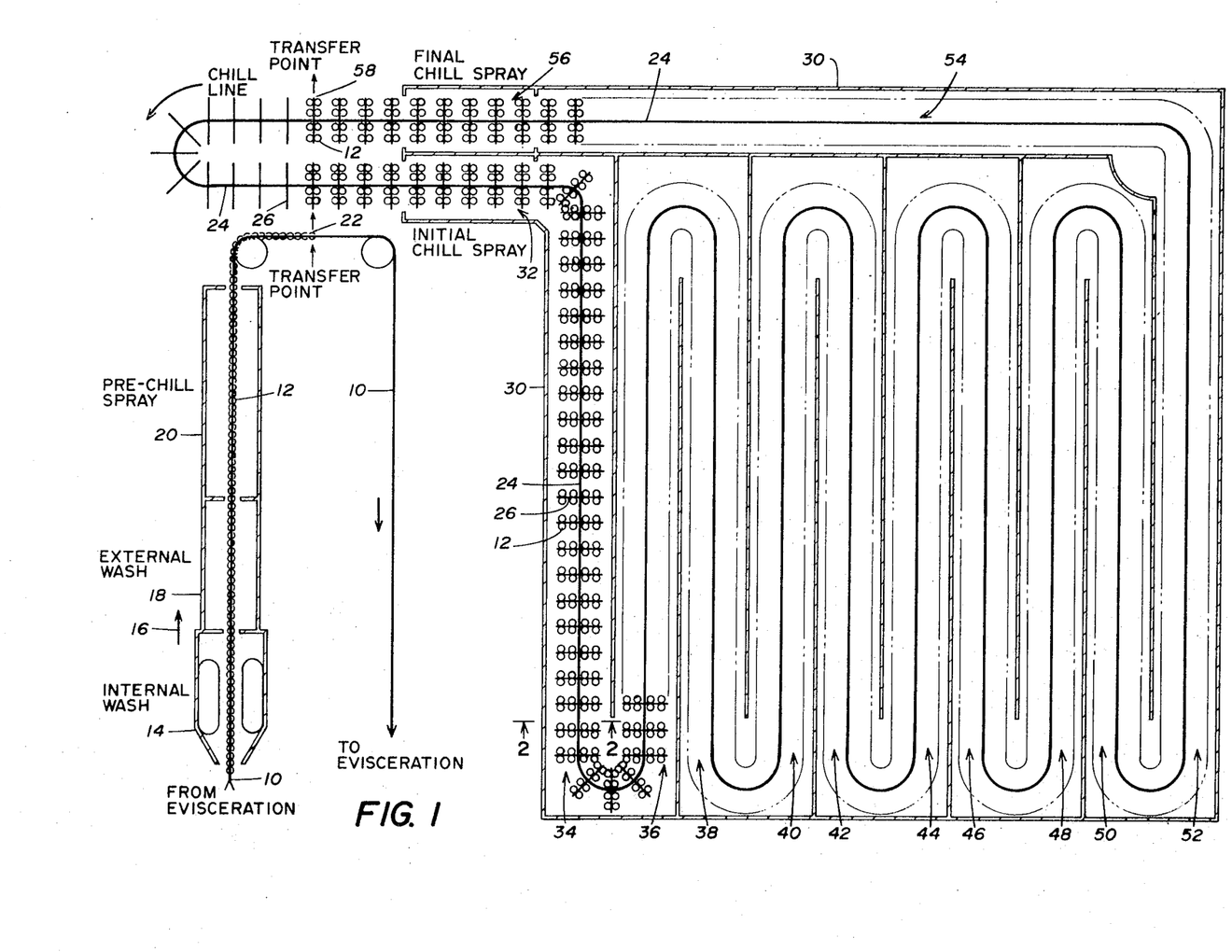
FIG. 1 is a pictorial view of the washing and chilling process zones in accord with the present invention.

Referring first to FIG. 1, process lines for internally and externally washing fowl and for chilling fowl prior to packaging are pictorially represented. When fowl, such as chickens, are processed for human consumption, their feathers are first removed. Thereafter, the chickens are eviscerated. These procedures are generally conducted while the chickens are suspended from shackles on a conveyor system. Such a conveyor is represented by the line 10 in FIG. 1.

After evisceration, the chickens, each of which are pictorially represented as a small circle 12 on conveyor 10, are internally and externally washed. The chickens 12 are conveyed through housing 14 containing spray equipment for internally washing the abdominal areas of the chickens 12. Thereafter, the chickens are conveyed in the direction of arrow 16 into second housing 18 in which the chickens 12 are externally washed. Housing 18 encloses liquid spray equipment for effecting the external washing process.

Thereafter, the chickens 12 are conveyed into a third housing 20, containing additional liquid spray equipment. Within housing 20 the chickens 12 are prechilled by contact with a cold liquid spray such as a chilled water spray. The chickens are then conveyed out of housing 20 to a transfer point 22. At the transfer point 22 the chickens are removed from the conveyor 10 and transferred to a second conveyor system, generally designated by line 24.

After the chickens 12 are removed from the conveyor 10, the latter returns in the direction of arrow 28 to the processing area (not shown) in which the chickens are eviscerated. There, freshly slaughtered chickens are placed on the conveyor 10 and eviscerated. The conveyor 10 then returns eviscerated chickens 12 to housings 14, 18 and 20 where they are internally washed, externally washed and prechilled.

The second conveyor 24 can include a plurality of conveyor trucks riding on a rail or the like. In the preferred embodiment, each of the conveyor trucks carries a shackle assembly capable of suspending eight chickens in a processing position. The shackle assemblies, explained in greater detail later, are generally represented by cross bars 26 on the conveying line 24. As can be seen, eight chickens 12 are suspended from each of the shackle assemblies 26.

Conveyor 24 carries the chickens 12 on shackle assemblies 26 into a large housing 30 wherein the chickens are contacted with a chilled liquid spray and a cold gas stream. Housing 30 is divided into several subzones. In the first subzone 32, the chickens are contacted only with a chilled liquid spray. Thereafter, the conveyor 24 travels through several similar subzones 34, 36, 38, 40, 42, 44, 46, 48, 50, 52 and 54, in a reversing path. In each of the subzones 34 through 54, the chickens are contacted with both a chilled liquid spray and a cold stream. The conveyor 24 transfers the chickens from subzone 54 to a final subzone 56 wherein the chickens are contacted only with a chilled liquid spray. The chickens then pass from the housing 30 to a transfer point 58 where the chickens are removed from the shackle assemblies 26. From transfer point 58, the chickens are carried by suitable conveyance means to the next processing point, usually packaging. The conveyor 24 then returns with empty shackle assemblies 26 to transfer point 22 to again receive chickens 12 from conveyor 10.

As can be seen, chickens 12 are pictorially represented by small circles on shackle assemblies 26 as they enter initial chill spray zone 32, pass through subzone 34 and into subzone 36. It is to be understood that the subzones 36 through 54 likewise house the conveyor 24 and shackle assemblies 26 loaded with chickens 12. For purposes of simplicity, the chickens 12 and the conveyor system 24 are represented by a central line and the pair of dot dash lines traversing subzones 36 through 54. The pictorial representation of the chickens 12 is resumed as the conveyor 24 leaves subzone 54, passes through a final chill spray zone 56, out of housing 30, and to the transfer point 58.

Figure 2:
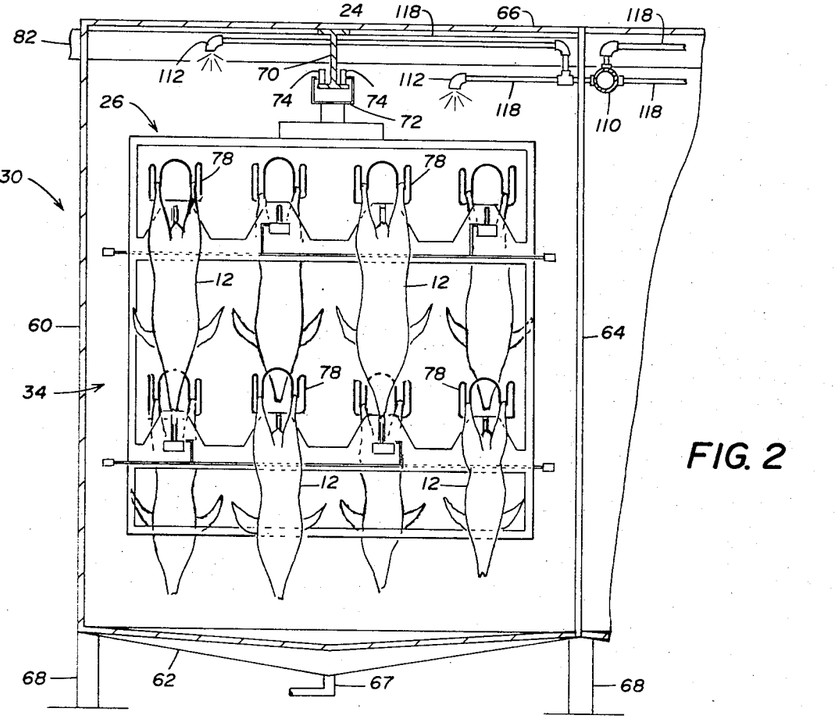
FIG. 2 is a greatly enlarged, cross sectional view in detail of FIG. 1 taken along section line 2—2.

Reference will now be made to FIG. 2, a greatly enlarged, detailed, cross sectional view of subzone 34 containing conveyor 24 and shackle assemblies 26. Wall 60, floor 62, interior wall 64 and roof 66 combine to form an enclosure for subzone 34 and also form a part of housing 30. As can be seen, the entire housing 30 is situated on suitable foundation supports 68 so that it rests above the ground. The floor 62 is sloped from the ends of subzone 34 toward the center of subzone 34 where a drain leading into outlet conduit 67 is situated.

A conveyor rail 70 is attached to the ceiling 66 by conventional fastening means. A conveyor truck 72 is is movably situated on rail 70 by means of wheels 74. A multiple fowl shackle assembly, generally designated 26, is affixed to the conveyor truck 72. The shackle assembly 26 carries eight single fowl shackles 78. Chickens 12 are suspended from the shackles. Four of the shackles 78 are situated on each side of the shackle assembly 26. Also situated within the subzone 34 are liquid spray pipes 118 and air ducts 82. The purpose and operation of these will be described in greater detail in a later portion of the specification.

The shackle assembly 26 can be designed in accord with the disclosure in a copending application entitled "Multiple Fowl Shackle," No. 181,840, filed Sept. 20, 1971, so they are capable of automatically releasing and dropping the chickens 12 at a predetermined point along the conveyor line. In accord with the present invention, the shackle assembly 26 is designed to drop the chickens 12 at the transfer point 58. The chickens 12 held by shackle assemblies are sprayed with a chilled liquid within housing 30.

Figure 3:
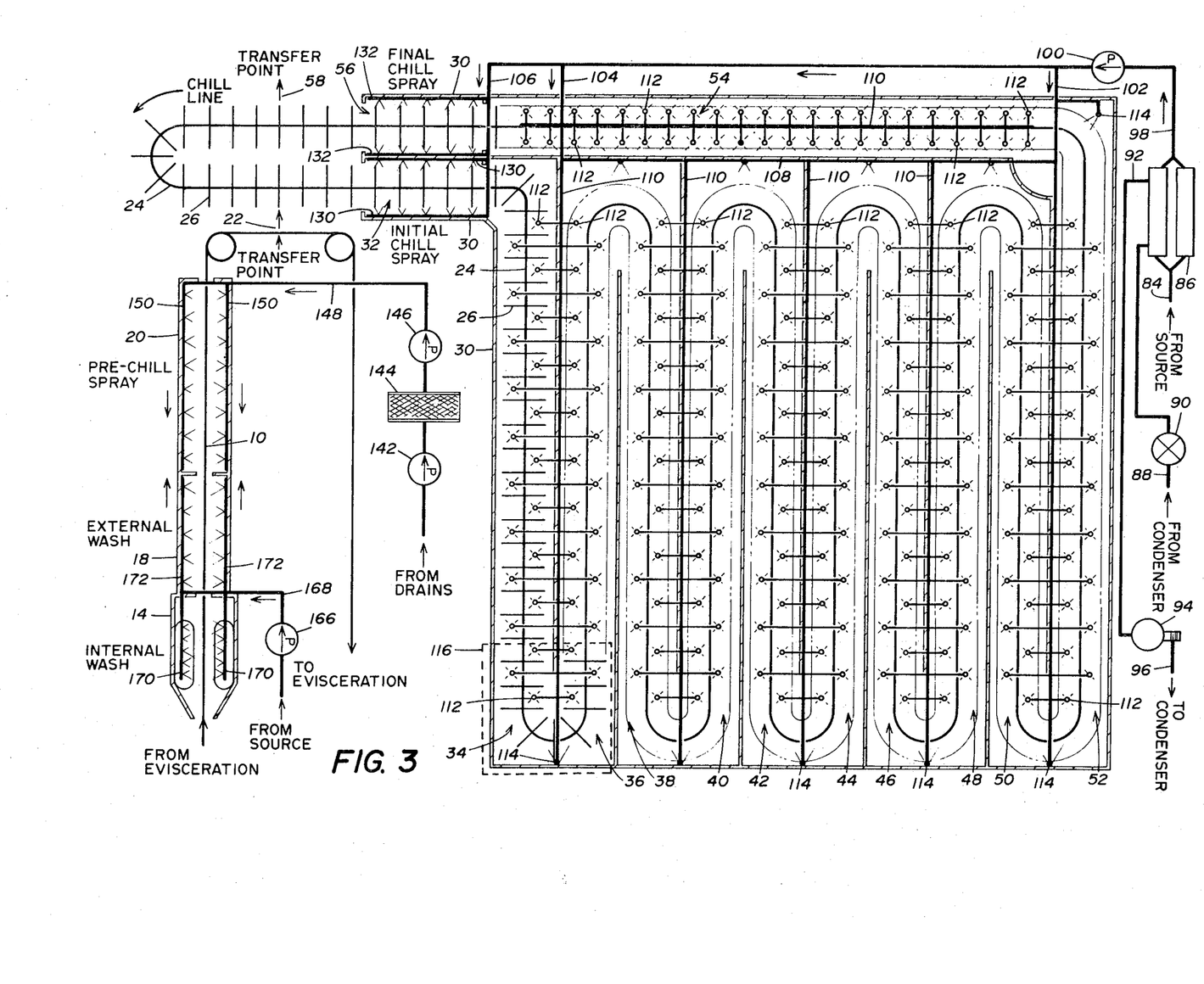
FIG. 3 is a pictorial view of the process zones similar to that of FIG. 1 showing the liquid chill spray and washing systems as integrated with the process zones.

FIG. 3 is a pictorial representation of the chilled liquid spray system. FIG. 3 omits the representation of chickens 12 on the conveyor 24, but includes the chilled liquid spray system. With respect to the chilled liquid spray system, a suitable liquid such as water is obtained from a source (not shown) connected to conduit 84. The water is chilled in heat exchanger 86. Heat exchanger 86, the evaporator of a refrigeration system, is supplied with a suitable pressurized and cooled refrigerant for cooling the water. The outlet of a refrigeration system condenser (not shown in this FIGURE) is connected to conduit 88 which in turn has interposed therein expansion valve 90. From expansion valve 90, the refrigerant travels to the heat exchanger 86 where it is placed in heat transfer relationship with the water passing through the heat exchanger 86. Expanded and heated refrigerant travels from the heat exchanger 86 through conduit 92 to a suitable compressor 94 where it is compressed and returned along conduit 96 to the condenser.

The chilled water exits from the heat exchanger 86 into conduit 98 where it passes through a pump 100. Pump 100 supplies conduits 102, 104, and 106 with chilled water. Conduits 102 and 104 are in turn connected to a header 108 which feeds supply conduits 110. Each of the supply conduits 110 feeds a plurality of spray nozzles 112 situated above the conveyor 24 in each of the subzones 34 through 54. Each of the spray nozzles 112 directs a spray of chilled water downwardly onto the chickens held in shackle assemblies 26.

Figure 4:
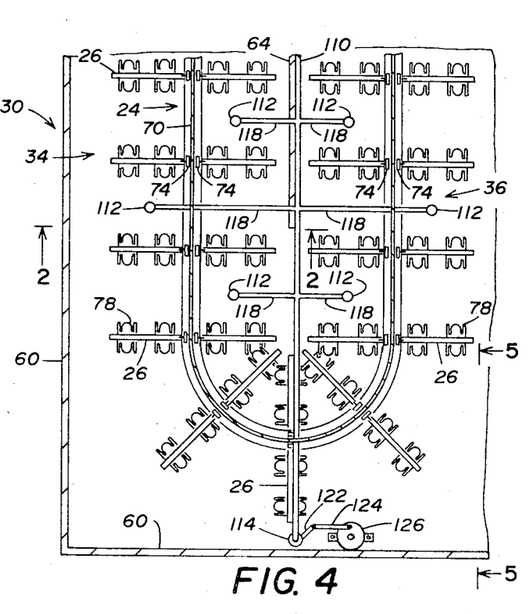
FIG. 4 is a greatly enlarged plan view in detail of a portion of one of the process zones of FIG. 3 outlined in dotted lines.
Figure 5:
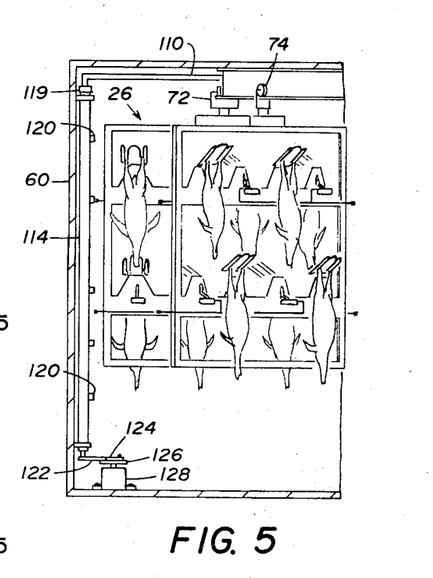
FIG. 5 is a cross sectional view of FIG. 4 taken along section line 5—5.

In addition to the spray nozzles 112, a plurality of horizontally oscillating spray bars 114 are provided at each of the junctures between subzones 34 through 54. The oscillating spray bars 114 direct a water spray at the shackle assemblies 26 to assure that all the chickens carried thereby are adequately contacted with chilled water. The overhead spray nozzle 112 and oscillating spray bars 114 are better shown in FIGS. 2, 4 and 5. FIG. 4 is an enlarged plan view in partial cross section of the portion of the juncture of subzones 34 and 36 surrounded by dotted lines 116. For purposes of simplicity, the chickens have been omitted in FIG. 4. FIG. 5 is an enlarged cross sectional view of FIG. 4 taken along section line 5—5. It will be noted that FIG. 2 is also an enlarged cross sectional view of the subzone 34 as shown in FIG. 4.

Referring now to FIGS. 2 and 4, the housing 30 is shown forming an outside wall 60 for subzone 34. An interior wall 64 is also provided. The supply conduit 110 connects to a plurality of spray pipes 118 having spray nozzles 112 situated at the ends thereof. The spray pipes 118 are arranged in alternating lengths in a preferred embodiment to assure adequate liquid coverage of chickens 12 on alternating sides of the conveyor 24. Referring to FIGS. 4 and 5, supply conduit 110 is also connected through a rotatable fluid coupling 119 to oscillating spray bar 114. The spray bar 114 has a plurality of spray nozzles 120 situated to direct a spray outwardly in a horizontal direction toward chickens being carried on shackle assemblies 26. The spray bar 114 is oscillated about its vertical axis by means of an arm 122 connected to the bottom of the bar 114. An actuating arm 124 is connected to oscillating arm 122. Actuating arm 124 is attached at its other end to an eccentric pivot on a wheel 126 driven by a suitable motor 128. As wheel 126 rotates, the arm 124 is reciprocated to move oscillating arm 122 back and forth, which in turn oscillates spray bar 114. Oscillation of spray bar 114 is directed through an arc to provide full coverage of chickens being carried on the shackle assemblies 26 as they round the corner of conveyor 24 from subzone 34 to subzone 36. The remainder of the oscillating spray bars 114 at junctures of subzones 34 through 54 operate in a similar manner.

Subzones 32 and 56 (FIG. 3) are also supplied with chilled water via conduit 106. In the initial chill subzone 32, conduit 106 supplies two oscillating horizontal spray bars 130 having a plurality of nozzles thereon. These nozzles direct a water spray toward shackle assemblies 26 to provide an initial chilling of chickens carried on shackle assemblies 26. Sufficient volume is pumped through the nozzles connected to spray bars 130 to provide a suitable liquid curtain. The curtain helps to prevent a substantial ingress of ambient air into or egress of cold air from the inlet to housing 30. In a similar manner, conduit 106 feeds two horizontal spray bars 132 situated along the sides of final chill subzones 56. Likewise, a sufficient volume of chilled water is pumped from the nozzles on oscillating horizontal spray bars 132 to form a suitable liquid curtain at the outlet from housing 30. Spray bars 130 and 132 are oscillated in a manner similar to that shown in connection with the vertical oscillating spray bars 114. An eccentric wheel drive (not shown) can be utilized.

Figure 6:
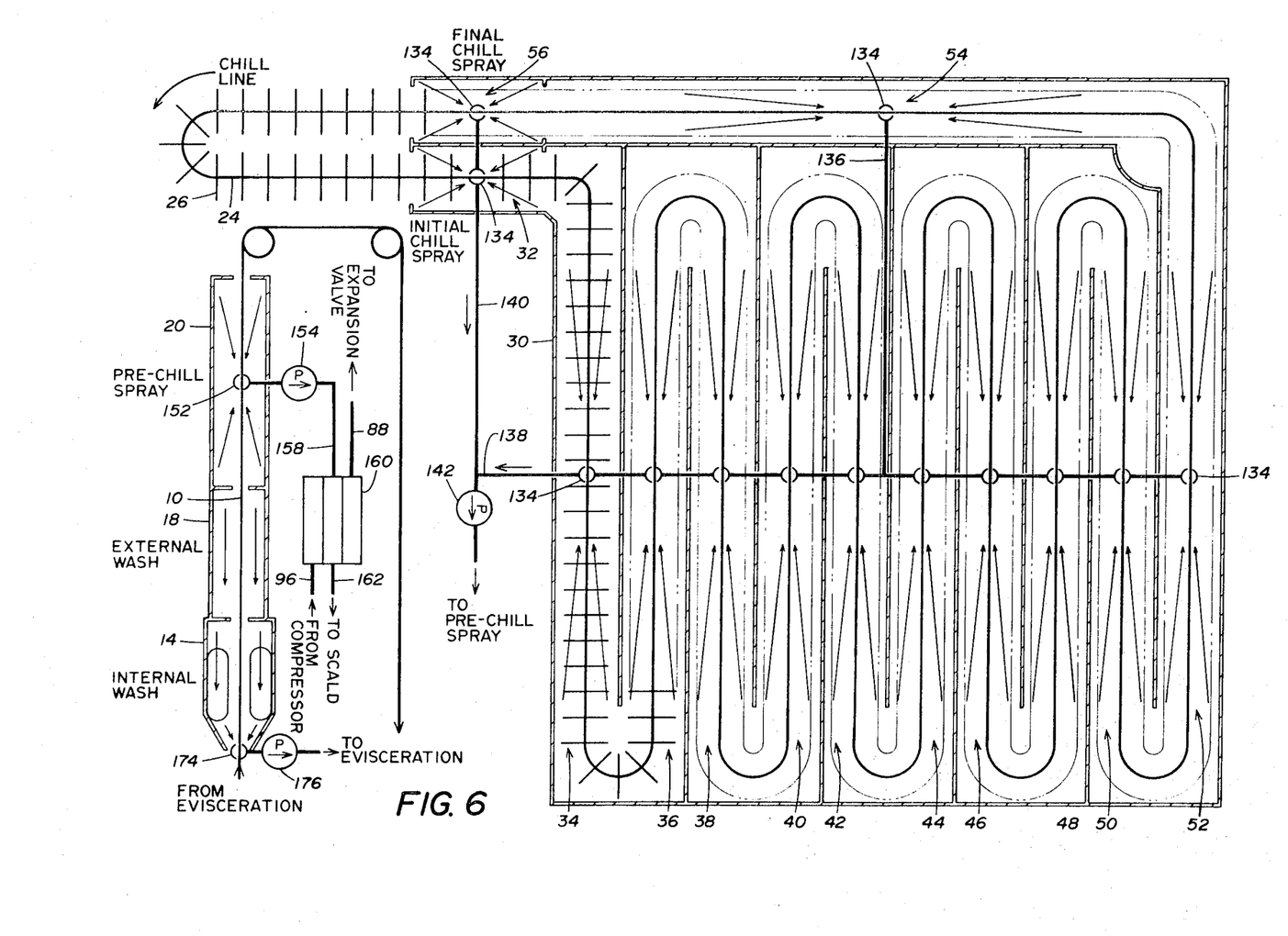
FIG. 6 is a pictorial plan view of the washing and chilling zones similar to that of FIG. 1 showing the liquid collection system in accord with the present invention.

Referring now to FIG. 6, the chilled water collection system is shown in connection with a pictorial representation of the process line. Each of the subzones 32 through 56 contains a drain 134. The floor of each of the subzones 32 through 56 are so arranged to slope toward the center thereof where drains 134 are situated. The chilled liquid sprayed from nozzles 112 is collected by drains 134 and routed through drain pipes 136, 138 and 140. The chilled water thus collected is routed via conduits 136, 138 and 140 to the inlet of a pump 142.

Referring back to FIG. 3, pump 142 pumps the chilled liquid thus collected from housing 30 through a filter 144. The filter 144 removes particulate matter from the used chilled water. Another pump 146 receives the water from filter 144 and pumps it into conduit 148. Conduit 148 feeds prechill spray bars 150 oscillating within the housing 20. The spray bars 150 are also oscillated in a manner similar to oscillating spray bars 114, i.e., with an eccentric wheel (not shown) driven by an electric motor. The water thus sprayed on the chickens carried by conveyor 10 is still sufficiently cold to prechill the chickens prior to transfer to conveyor 24. Since the unit volume of water per chicken sprayed in housing 20 is much higher than the water volume to chicken ratio existing in housing 30, substantial pre-chilling of the chickens can be accomplished in prechill housing 20.

The water sprayed from headers 150 is collected in a drain 152 (FIG. 6) at the center of the floor of housing 20. It is to be understood that the floor of housing 20 slopes toward the drain 152. The water collected by drain 152 is pumped via pump 154 into conduit 158 where it passes through a refrigeration system condenser 160. This is the same condenser referred to in connection with the refrigeration system of FIG. 3. Thus, the refrigerant from compressor 94 (FIG. 3) is condensed and transmitted via refrigerant conduit 88 to the heat exchanger 86. The spent water pumped into condenser 160 (FIG. 6) is heated by the hot compressed refrigerant passing through refrigerant conduits 88 and 96. The water thus heated passes from condenser 160 into conduit 162 where it is thereafter emptied into a scald tank (not shown). As will be noted, the chickens are scalded prior to evisceration to aid feather removal.

Thus the water initially chilled in evaporator 86 (FIG. 3) has heat added thereto as it is sprayed on the chickens within the housing 34 and subzones 32 through 56. Additional heat is added in the prechill spray within housing 20. The water is then heated to a high temperature in heat exchanger 160 and used to scald the chickens. Using this method of the present invention, the chilled water has been effectively reused in different process zones. Additionally, the energy has been conserved by interconnecting the water refrigeration system at both ends of the processing line.

Still referring to FIG. 3, wash water is supplied to housings 14 and 18 from a source (not shown) via pump 166. The wash water is pumped through conduit 168 to a first set of spray headers 170 within housing 14. Conduit 168 also supplies a second set of headers 172 within housing 18. The spray headers 170 and 172 are constructed using techniques, for example, as shown in the copending application "Internal Fowl Washing Device," Ser. No. 177,221, filed Sept. 2, 1971, to effect an internal and external wash of chickens being conveyed through housings 14 and 18 by conveyor 10.

As shown in FIG. 6, the internal and external wash water is collected in a drain 174 at the inlet end of housing 14. The floors of housing 18 and 14 both slope toward drain 174. The wash water thus collected is pumped via pump 176 to the processing zone where the chickens are eviscerated. Fresh water is thus continuously used to internally and externally wash the chickens. The wash water is not discarded, but is conserved by utilizing it in the evisceration process. After use in conjunction with evisceration, the water can be discarded.

Figure 7:
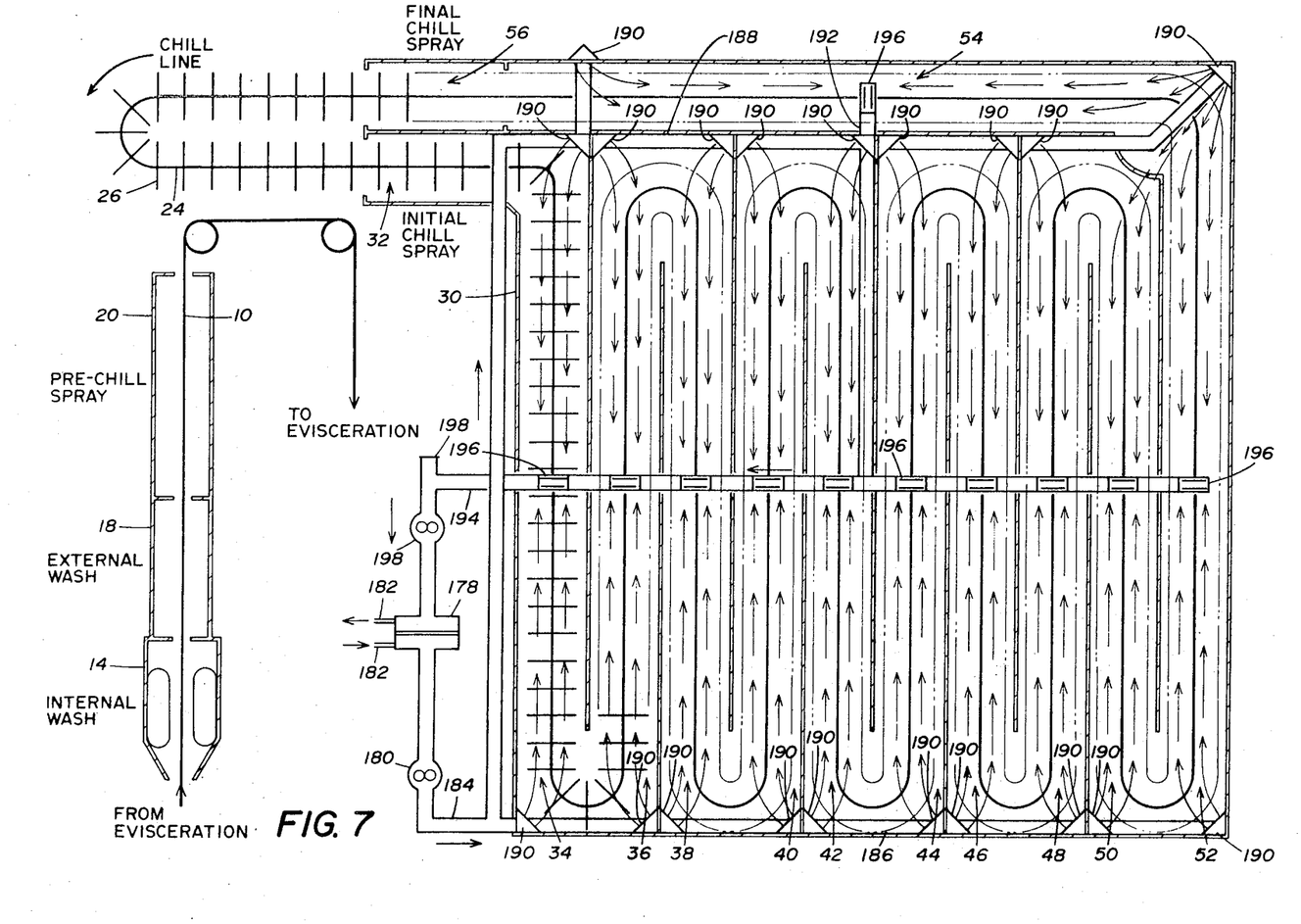
FIG. 7 is a pictorial plan view similar to that of FIG. 1 showing the cold gas conduit system and gas flow directions as integrated into the process zones of the present invention.

In addition to the cold water spray provided within the housing 30, gaseous cooling means are also provided. Referring to FIG. 7, a gas, such as air, is drawn through an evaporative heat exchanger 178 by a blower 180. The heat exchanger 178 is supplied with a chilled refrigerant through conduits 182 connected to a suitable refrigeration system (not shown). The outlet of the blower 180 is connected to duct 184 which in turn supplies two header ducts 186 and 188. Registers 190 in fluid communication with the header ducts 186 and 188 are situated at each end of the subzones 34 through 54. Cold air enters each of the subzones 34 through 54 and through registers 190, traveling in the direction of the arrows. Chickens carried by shackle assemblies are contacted by the cold air streams in the respective subzones 34 through 54. The cold air thus facilitates chilling of the chickens as they pass through the subzones.

An exhaust system is provided for the chilled air via intake duct 192 which is in turn connected to intake duct 194. Intake registers 196 are situated in each of the subzones 34 through 54. These registers 196, communicating with the intake ducts 192 and 194, draw the air from the center of the subzones and recirculate it via blower 198 to the heat exchanger 178 where the air is recooled and again recirculated through subzones 34 through 54. Makeup air can be supplied when necessary through air valve 198 connected to duct 194.

The air flow within subzones 34 through 54 is designed such that flow occurs from the ends of the subzones toward the centers of the subzones. Thus the housing 30 is protected from a substantial amount of ambient air ingress and is also provided with means for preventing egress of cold air circulating within the subzones.

The cold air streams in conjunction with chilled liquid sprays, described above, provide an efficient, economical, sanitary method for chilling chickens or other fowl during processing. The method of the present invention overcomes the drawbacks of prior art techniques enumerated above. Other advantages will be apparent to those of ordinary skill in the fowl processing art. Although a preferred embodiment has been described herein, it is intended that the invention as a whole be limited only by the definition contained in the appended claims.

What is claimed is:

1. In a method of processing eviscerated fowl prior to packaging wherein the fowl are suspended from shackles on a conveying system, the improved method comprising:
   conveying the fowl through a first washing zone,
   spraying the fowl with a washing fluid in the first zone to clean and flush the internal portions of the fowl,
   spraying the fowl with a washing fluid in the first zone to clean and flush the external portions of the fowl,
   conveying the fowl to a second zone for further processing,
   spraying the fowl in the second zone with a chilled fluid.

2. The method of claim 1 further comprising:
   conveying the fowl to a third zone,
   spraying the fowl in the third zone with a chilled fluid.

3. The method of claim 2 wherein the temperature of the chilled fluid in the third zone is lower than the temperature of the chilled fluid in the second zone.

4. The method of claim 2 further comprising:
   passing a stream of cold gas over said fowl in the third zone.

5. The method of claim 4 wherein the third zone comprises a plurality of subzones through which the fowl are conveyed in a reversing loop pattern, the method further comprising:
   injecting the stream of cold gas at the ends of the subzones and exhausting the air between the ends of the subzones.

6. The method of claim 2 further comprising:
   collecting the chilled fluid sprayed on the fowl in the third zone to form a first stream of said fluid,
   spraying the fowl in the second zone with fluid from said first stream of fluid.

7. The method of claim 6 further comprising:
   collecting the chilled fluid sprayed on the fowl in the second zone to form a second stream of said fluid,
   heating the fluid in said second stream,
   forwarding the heated fluid to a fourth zone for use in initial scalding of the fowl.

8. The method of claim 7 further comprising:
   cooling said fluids supplied to the third zone by placing said fluid in heat transfer relationship with an evaporating refrigerant which is compressed, condensed and evaporated in a closed refrigeration cycle.

9. The method of claim 8 further comprising:
   heating said second stream of fluid by condensing said refrigerant in heat transfer relationship with said second stream.

10. The method of claim 2 wherein the step of conveying from the second zone to the third zone includes:
    transferring fowl from a conveyor having shackles carrying no more than two fowl to a conveyor having shackles carrying more than two fowl.

11. The method of claim 2 further comprising:
    collecting said chilled gas after passing it over said fowl in said third zone and recirculating said gas through the third zone.

12. The method of claim 11 further comprising:
    chilling said gas before it is recirculated through said third zone.

13. A method for cooling fowl during processing comprising:
    conveying fowl along a preselected path through an enclosed, multiple path, cooling zone,
    spraying chilled liquid on the fowl in the cooling zone,
    contacting the fowl with a stream of cooled gas in the cooling zone.

14. The method of claim 13 further comprising:
    collecting said gas after contacting the fowl therewith,
    recooling the collected gas,
    forming at least a part of said stream of cooled gas with the recooled gas.

15. The method of claim 13 further comprising:
    spraying said fowl with a mist of said chilled liquid from a position above the path in which fowl are conveyed.

16. The method of claim 15 wherein said path reverses direction a plurality of times to form said multiple path cooling zone, the method further comprising:
    spraying said fowl from the side in the region in which the path reverses.

17. The method of claim 13 wherein a plurality of fowl at each of a plurality of spaced positions are conveyed along said path.

18. A method for cooling fowl during processing comprising:
    conveying a plurality of fowl at each of a plurality of spaced positions along a preselected path through an enclosed cooling zone,
    introducing a stream of cooled gas into said cooling zone to contact said fowl therewith,
    withdrawing said gas after it contacts said fowl.

19. The method of claim 18 further comprising:

spraying a chilled liquid on the fowl as it is conveyed through the cooling zone.

20. A system for processing fowl comprising:
first conveyor means for transporting fowl along a preselected path,
a washing station positioned along the path of said first conveyor means including fluid spray means for cleaning said fowl,
a prechill station positioned along the path of said first conveyor means including dispensing means for spraying a chilled fluid on said fowl as they pass through said prechill station.

21. The system of claim 20 wherein said washing station further comprises:
fluid spray means for internally washing said fowl,
fluid spray means for externally washing said fowl.

22. The system of claim 20 wherein said first conveyor means carries a plurality of shackles for suspending fowl in a processing position.

23. The system of claim 20 further comprising:
a transfer station positioned downstream from said prechill station along the path of said first conveyor means.

24. The system of claim 23 further comprising:
second conveyor means for transporting fowl along a preselected path,
said conveyor means including a plurality of shackle carrying members, each of said members being capable of suspending more than one fowl in a processing position.

25. The system of claim 24 further comprising:
a transfer station positioned along the path of said second conveyor means at which station fowl are placed on said shackle carrying members.

26. The system of claim 24 further comprising:
spray means positioned along the path of said second conveyor means for spraying a chilled fluid on said fowl being conveyed by said second conveyor means,
means for supplying said spray means with a chilled fluid.

27. The system of claim 26 further comprising:
housing means for enclosing a major portion of said second conveyor means and said spray means.

28. The system of claim 27 further comprising:
delivery conduit means for introducing a chilled gas into said housing means,
return conduit means for exhausting said chilled gas after contacting said fowl suspended from said second conveyor means,
blower means for moving said chilled gas through said delivery conduit means,
refrigeration means for chilling said gas delivered to said delivery conduit means.

29. The system of claim 27 further comprising:
fluid collection means positioned along the path of said second conveyor means for receiving spent chilled fluid after being sprayed from said spray means.

30. The system of claim 29 further comprising:
fluid conduit means for delivering spent chilled fluid from said fluid collection means to said fluid dispensing means at said prechill station,
pump means for moving said spent chilled fluid in said fluid conduit means.

31. The system of claim 20 further comprising:
fluid collection means in said prechill station including conduit means for collecting spent chilled fluid from said prechill station and delivering said spent chilled fluid to a scald station upstream of said washing station.

32. The system of claim 20 further comprising:
fluid collection means in said washing station including conduit means for collecting spent washing fluid from said washing station and delivering it to an evisceration station upstream of said washing station.

33. The system of claim 26 further comprising:
refrigeration means for chilling said chilled fluid including a compressor, evaporator and condensor,
conduit means for feeding said spray means with a chilled fluid, said evaporator in heat transfer relationship with said conduit means.

34. The system of claim 33 further comprising:
fluid collection means in said prechill station including conduit means for collecting spent chilled fluid from said prechill station and delivering said spent chilled fluid to a scald station upstream of said washing station,
said condenser in heat transfer relationship with said conduit means delivering said fluid to said scald station.

* * * * *